United States Patent
Zhao

(10) Patent No.: US 9,456,110 B2
(45) Date of Patent: Sep. 27, 2016

(54) METHOD FOR IMPROVING VIDEO OUTPUT DEFINITION AND TERMINAL DEVICE

(75) Inventor: Ming Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/401,882

(22) PCT Filed: Jul. 10, 2012

(86) PCT No.: PCT/CN2012/078417
§ 371 (c)(1),
(2), (4) Date: Nov. 18, 2014

(87) PCT Pub. No.: WO2013/170528
PCT Pub. Date: Nov. 21, 2013

(65) Prior Publication Data
US 2015/0085193 A1 Mar. 26, 2015

(30) Foreign Application Priority Data

May 18, 2012 (CN) .......................... 2012 1 0155068

(51) Int. Cl.
*H04N 5/46* (2006.01)
*H04N 5/208* (2006.01)
(Continued)

(52) U.S. Cl.
CPC .............. *H04N 5/208* (2013.01); *G09G 5/006* (2013.01); *H04N 7/015* (2013.01); *H04N 21/4122* (2013.01); *H04N 21/43635* (2013.01);
(Continued)

(58) Field of Classification Search
CPC .... H04N 19/117; H04N 19/37; H04N 19/16; H04N 19/587; H04N 19/59; G09G 2340/04; G09G 2360/02; G09G 5/005; G09G 5/006; G06F 3/14

USPC .................................................. 348/625, 555
See application file for complete search history.

(56) References Cited

U.S. PATENT DOCUMENTS 5,636,290 A * 6/1997 Kita ...................... G06T 11/001
358/518
5,923,384 A * 7/1999 Enomoto ......... H04N 21/23602
348/705
(Continued)

FOREIGN PATENT DOCUMENTS

CN 101212587 A 7/2008
CN 201191892 Y 2/2009
(Continued)

OTHER PUBLICATIONS

International Search Report of PCT/CN2012/078417 dated Mar. 7, 2013.

*Primary Examiner* — Michael Lee
(74) *Attorney, Agent, or Firm* — Banner & Witcoff, Ltd.

(57) ABSTRACT

The invention discloses a method and terminal device for improving video signal definition. The method includes: acquiring information of a connected display device; selecting a corresponding definition improving algorithm according to the acquired information of the display device to process video output signals, and finally outputting the processed video signals to the display device for display. By adopting the above technical scheme, the problem in the prior art of fuzzy or unclear display images caused by mismatching between output images of the mobile device and the connected display device as a uniform fixed algorithm is adopted to magnify images when a mobile device is connected to a display device for video play is solved.

9 Claims, 2 Drawing Sheets

(51) Int. Cl.
 *H04N 21/4402* (2011.01)
 *H04N 21/41* (2011.01)
 *H04N 7/015* (2006.01)
 *H04N 21/4363* (2011.01)
 *G09G 5/00* (2006.01)
 *H04N 7/01* (2006.01)

(52) U.S. Cl.
 CPC .. *H04N21/4402* (2013.01); *H04N 21/440263* (2013.01); *G09G 2340/045* (2013.01); *G09G 2370/042* (2013.01); *G09G 2370/12* (2013.01); *H04N 7/0125* (2013.01)

(56) References Cited

U.S. PATENT DOCUMENTS

| | | | | |
|---|---|---|---|---|
| 5,943,097 A * | 8/1999 | Horii | H04N 5/45 | 348/441 |
| 6,144,412 A * | 11/2000 | Hirano | G06T 3/4007 | 348/441 |
| 6,490,009 B1 * | 12/2002 | Asakura | H04N 5/44 | 348/705 |
| 7,020,081 B1 * | 3/2006 | Tani | H04L 12/2801 | 348/E7.07 |
| 7,047,325 B2 * | 5/2006 | Kondo | G06F 3/13 | 348/E5.024 |
| 7,224,402 B2 * | 5/2007 | Cho | H04N 5/21 | 348/441 |
| 7,421,191 B2 * | 9/2008 | Umemoto | H04N 5/775 | 348/558 |
| 7,636,125 B2 * | 12/2009 | Law | H04N 21/2662 | 348/458 |
| 8,810,732 B1 * | 8/2014 | Bozarth | H04N 5/268 | 348/555 |
| 2004/0046772 A1 * | 3/2004 | Ouchi | G09G 5/005 | 345/690 |
| 2005/0027912 A1 * | 2/2005 | Kondo | G06F 3/13 | 710/62 |
| 2006/0132479 A1 * | 6/2006 | Hong | G09G 5/006 | 345/213 |
| 2006/0288373 A1 * | 12/2006 | Grimes | G06F 3/14 | 725/62 |
| 2007/0030295 A1 * | 2/2007 | Chen | G09G 5/005 | 345/698 |
| 2008/0140886 A1 * | 6/2008 | Izutsu | G06F 3/1438 | 710/69 |
| 2008/0198264 A1 * | 8/2008 | Balram | G06F 3/14 | 348/459 |
| 2008/0247673 A1 * | 10/2008 | Kirihara | H04N 21/235 | 382/304 |
| 2009/0051820 A1 * | 2/2009 | Oikawa | G06F 3/14 | 348/705 |
| 2009/0161016 A1 * | 6/2009 | Wong | H04N 7/012 | 348/607 |
| 2010/0097357 A1 * | 4/2010 | Lin | G09G 5/006 | 345/204 |
| 2010/0165014 A1 * | 7/2010 | Wu | G09G 5/391 | 345/698 |
| 2010/0169935 A1 | 7/2010 | Abbruzzese | | |
| 2010/0214480 A1 | 8/2010 | Kitamori | | |
| 2011/0206296 A1 * | 8/2011 | Sakaguchi | G06T 3/4053 | 382/299 |
| 2011/0234910 A1 * | 9/2011 | Takayama | G06T 3/40 | 348/581 |
| 2011/0316962 A1 | 12/2011 | Doi et al. | | |
| 2011/0317067 A1 | 12/2011 | Hsieh | | |

FOREIGN PATENT DOCUMENTS

| | | |
|---|---|---|
| CN | 101630502 A | 1/2010 |
| CN | 102202420 A | 9/2011 |
| CN | 202121660 U | 1/2012 |

* cited by examiner

METHOD FOR IMPROVING VIDEO OUTPUT DEFINITION AND TERMINAL DEVICE

TECHNICAL FIELD

The present document relates to the field of electronic communications, and in particular, to a device and method for improving video signal output definition.

BACKGROUND OF THE RELATED ART

At present, with the rapid development of communications, multimedia playback functions of mobile devices get more and more attention. In order to meet the needs of high definition video signal output of mobile devices, many mobile devices are configured with an HDMI port to be able to output high definition video signals to a display which is connected externally for display through an HDMI connection line. However, the existing image processing is primarily based on the image linear magnification or differential magnification technology. After an magnification process is performed on the video image in the mobile device by a fixed algorithm mode, the image is transmitted to a large-screen display device through an HDMI interface.

However, as size parameters of different display devices are generally different, if a unified algorithm is used to perform magnification process on the images, it will results in distortion of display of images with the same definition on display devices of different sizes. For example, if a video suitable for a small-sized display device is displayed on a large-sized display device, the image will be obviously fuzzy. Similarly, if a video suitable for a large-sized display device is displayed on a small-sized display device, the image will be clipped. In addition, in a case of magnifying the image with a fixed algorithm mode, if a high accuracy algorithm is used to perform an magnification process on the image, the definition is improved while there are high requirements on the operation processing capabilities of the mobile devices; and if a low accuracy algorithm is used to perform magnification on the image, the operation processing capabilities of the mobile devices may be suitable, but the improvement of the definition is limited.

SUMMARY

The embodiments of the present invention provide a method and terminal device for improving video output definition, which solves the problem in the prior art that a magnification process is performed on images using a unified fixed algorithm, and display devices of different sizes cannot be dynamically adapted, and therefore after the terminal device is connected to display devices of different sizes, it is difficult for the terminal device to acquire high definition play.

A method for improving video output definition according to an embodiment of the present invention, comprising: determining a correspondence between information of display devices and definition improving algorithms; connecting to a display device; acquiring information of the display device; determining a selected definition improving algorithm according to the correspondence between the information of display devices and the definition improving algorithms; processing original video signals according to the selected definition improving algorithm; and transmitting the processed video signals to the display device for display.

In an embodiment of the present invention, the step of acquiring information of the display device comprises: a display device control module acquiring the information of the display device beforehand and storing the information in an accessible storage space; and after connecting to the display device, transmitting the information of the display device to a device identification module through a connection line or a display device identification module acquiring the information of the display device through accessing the storage space.

In an embodiment of the present invention, after acquiring the information of the display device, the method further comprises: if it is judged that there is no definition improving algorithm suitable for the connected display device according to the correspondence between information of display devices and definition improving algorithms, directly transmitting the original video to the display device for display.

In an embodiment of the present invention, the definition improving algorithm comprises a nearest neighbor magnification algorithm, a bilinear magnification algorithm, a bicubic magnification algorithm, a linear magnification algorithm or a differential magnification algorithm.

A terminal device for improving video output definition according to an embodiment of the present invention, configured to be connected to a display device through an interface, output video signals stored by the terminal device to the display device for video play, wherein the terminal device comprises a display device identification module, a definition improving algorithm set module, and a video control module, wherein, the display device identification module is configured to be connected to the display device through an interface, identify information of the display device, and transmit the information of the display device to the definition improving algorithm set module; the definition improving algorithm set module is configured to store definition improving algorithms, and after receiving the information of the display device, select a suitable definition improving algorithm according to the correspondence between the information of display devices and definition improving algorithms and transmit the definition improving algorithm to a video controller module; and the video control module is configured to process the stored video signals according to the received definition improving algorithm, and transmit the processed video signals to the display device through an interface for display.

In an embodiment of the present invention, the display device identification module is configured to acquire the information of the display device through accessing an accessible storage space of the display device.

In an embodiment of the present invention, the display device identification module is further configured to notify the video controller module to directly output the original video signals to the display device for display when it is judged that there is no definition improving algorithm suitable for the connected display device according to the correspondence between the information of the display devices and definition improving algorithms.

In an embodiment of the present invention, the interface is a High Definition Multimedia Interface (HDMI), and is configured to be connected to the display device through an HDMI connection line.

In the embodiments of the present invention, the size information of the connected display device is identified, a suitable definition improving algorithm is dynamically selected to perform an image magnification process on the video information, and different definition algorithms are used for process of display devices of different sizes, which improves play experience of high definition videos, and solves the problem of fuzzy display due to performing an magnification process on the video images using a unified fixed algorithm. At the same time, different definition improving algorithms are used for display devices of different sizes, which effectively reduces the power consumption of the mobile terminal.

PREFERRED EMBODIMENTS OF THE PRESENT INVENTION

Specific implementations of the present document will be described in detail below in conjunction with accompanying drawings.

In the embodiments of the present invention, size information of the connected display device is identified, and video information is processed using different algorithm modules, and video images can be amplified dynamically according to the size of the connected display device, so that the video signals can similarly be played with high definition on different display devices.

Figure 1:
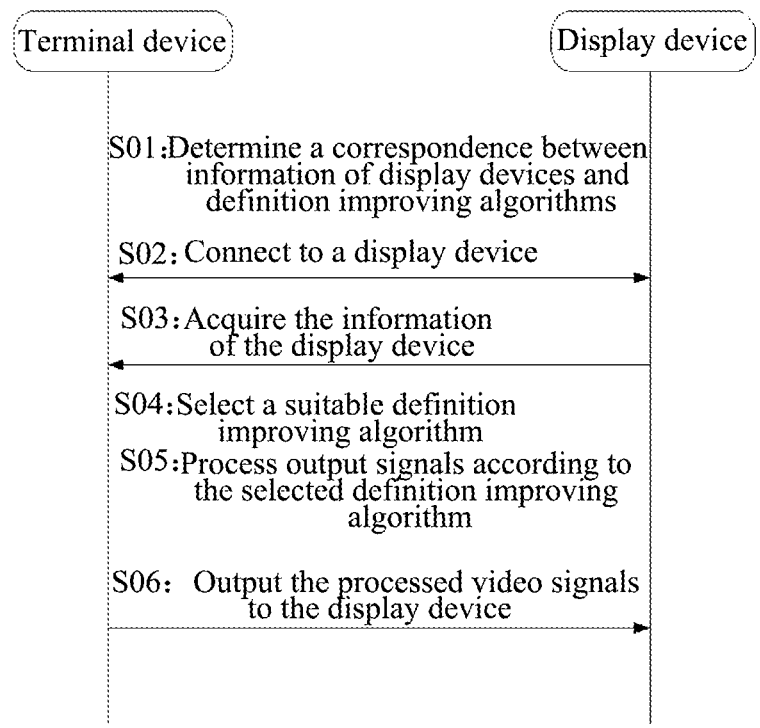
FIG. 1 is a flowchart of a process of improving video signal definition according to an embodiment of the present invention.

With reference to FIG. 1, illustrated is a diagram of a process of improving video signal definition according to the present embodiment, which comprises the following steps.

In S01, a correspondence between information of display devices and definition improving algorithms is determined;

Specifically, a correspondence may be determined according to information of the display device such as size information, resolution information, optimal play resolution information and definition improving and processing algorithms performed on the video signals. For example, definition improving algorithms which should be selected are correspondingly determined according to different sizes of the display devices, and then the correspondence is stored.

In S02, a display device is connected.

The display device is connected through a cable, which may be an HDMI connection line or other connection line.

In S03, the information of the display device is acquired.

The process of acquiring the information of the display device may be that the display device actively transmits the display information to the display device identification module through a connection line, or the display device identification module accesses the display device to acquire the information of the display device.

In S04, a selected definition improving algorithm is determined according to the correspondence between the information of display devices and the definition improving algorithms.

In S05, original video signals are processed according to the selected definition improving algorithm.

In S06, the processed video signals are transmitted to the display device for display.

Figure 2:
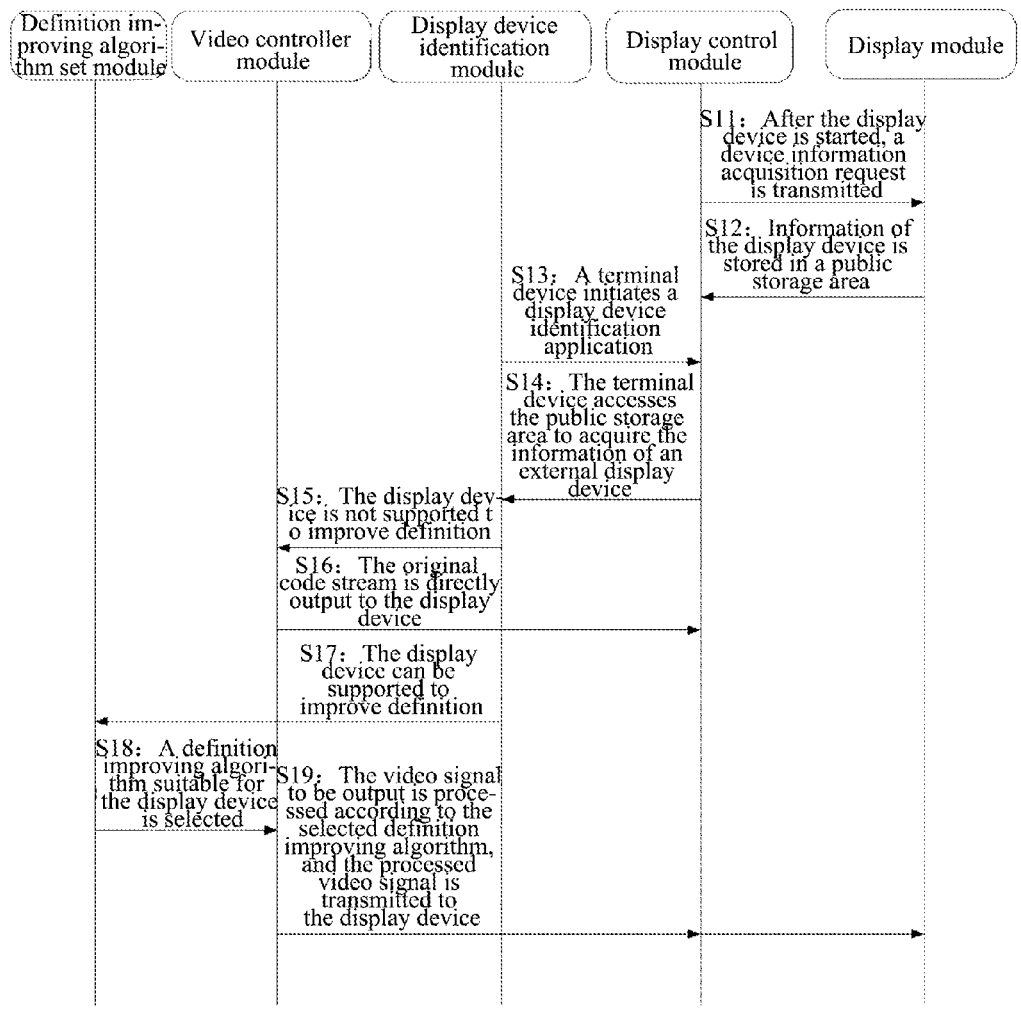
FIG. 2 is a flowchart of another process of improving video signal definition according to an embodiment of the present invention.

In an embodiment of the present invention, with reference to FIG. 2, illustrated is a flowchart of a process of improving video signal definition according to the present embodiment, which specifically comprises the following steps.

In S11, after the display device is started, a display control module transmits a display device information acquisition request to a display module;

In S12, the display module feeds the information of the display device to the display control module, and the display control module stores the information in a public storage area thereof;

In S13, after the mobile terminal is connected to a display device which is connected externally through an HDMI interface, a display device identification application is initiated to the display control module;

In S14, the display device identification module accesses the public storage area of the display control module through an HDMI interface. The storage area stores the information of the display device which is connected externally. The information of the display device includes but is not limited to sizes of the display devices, supported maximum resolutions, suggested display resolutions etc. After reading the information, the display device identification module judges whether the display device which is connected externally is a display device which can be supported by the local terminal to improve definition;

In S15, if the display device which is connected externally is not a display device which can be supported by the terminal to improve definition, a video controller module in the mobile terminal is directly notified; otherwise, the process proceeds to step S17;

In S16, after the video controller module receives the above notification, it will not perform any process on the output video, and directly outputs the original code stream to the display device which is connected externally;

In S17, the display device identification module transmits the information of the display device which is connected externally to a definition improving algorithm set module.

In S18, the definition improving algorithm set module selects a corresponding definition improving algorithm according to the received information of the display device, and transmits the selected algorithm type to the video controller module. The definition improving algorithm comprises a nearest neighbor magnification algorithm, a bilinear magnification algorithm, a bicubic magnification algorithm, a linear magnification algorithm or a differential magnification algorithm.

In S19, the video controller module processes the video data to be output according to the received algorithm, and transmits the processed video data to the display device which is connected externally for display.

Figure 3:
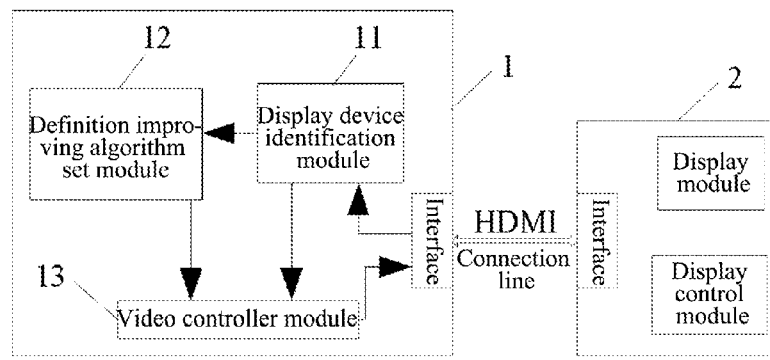
FIG. 3 is a structural diagram of a terminal device according to an embodiment of the present invention.

With reference to FIG. 3, illustrated is a structural diagram of a terminal device according to the present embodiment. The terminal device is connected to a display device through an HDMI connection line, can identify the information of the connected display device, and select a suitable definition improving algorithm according to the identified display information to process the output video signals, and transmits the processed video signals to the display device for display. Wherein, the received information related to the display device may include one or more of the information such as sizes of the display devices, supported resolutions, optimal display resolutions etc.; and the definition improving algorithm selected for processing the video signals may include a nearest neighbor magnification algorithm, a bilinear magnification algorithm, a bicubic magnification algorithm, a linear magnification algorithm, a differential magnification algorithm or other suitable algorithms.

Preferably, improvement of video signal definition may be implemented by using a hardware module mode, or a software algorithm mode. The improvement of video signal definition will be described below by taking implementation using the software algorithm mode as an example. The terminal device 1 may include a display device identification module 11, a definition improving algorithm set module 12 and a video controller module 13; wherein, the display device identification module 11 is connected to a display device 2 through an interface, can acquire information related to the connected display device 2, and can judge whether the connected display device 2 supports display of the video signals on which a definition improving process is performed by the video processing device after receiving the information related to the display device 2; if the display device does not support display of the video signals on which the definition improving process is performed, the video controller module 13 is directly notified not to process the original video signals and transparently transmit the original code stream signals directly to the display device 2 for display; and if the connected display device 2 can support the definition improving process, the display identification module 11 directly transmits the received information of the display device to the definition improving algorithm set module 12. The definition improving algorithm set module 12 stores different types of processing algorithms which are commonly used, which may include a nearest neighbor magnification algorithm, a bilinear magnification algorithm, a bicubic magnification algorithm, a linear magnification algorithm, a differential magnification algorithm or other suitable algorithms. After receiving the information related to the display device 2, the most appropriate definition algorithm is analyzed and selected according to the correspondence determined based on display devices and definition improving algorithms, and is transmitted to the video controller module 13. The video controller module 13 performs a definition improving process on the video signals according to the received algorithm, and outputs the processed signals to the display device 3 for display through an interface. Of course, the display identification module 11 may not judge whether the connected display device 2 supports performing a definition improving process on the video, and directly transmits the identified information of the display device to the definition improving algorithm set module 12, and the definition improving algorithm set module 12 selects a closest definition improving algorithm for the connected display device 2 according to the correspondence determined based on the display information and the definition improving algorithms, and transmits the definition improving algorithm to the video controller module 13.

A person having ordinary skill in the art can understand that all or a part of steps in the above method can be implemented by programs instructing related hardware, which can be stored in a computer readable storage medium, such as a read-only memory, a disk or a disc etc. Alternatively, all or a part of steps in the above examples can also be implemented by one or more integrated circuits. Accordingly, each module/unit in the above embodiments can be implemented in the form of hardware, or can also be implemented in the form of software functional module. The present document is not limited to any particular form of a combination of hardware and software.

It should be illustrated that the present document may have many other embodiments. A person having ordinary skill in the art can make various corresponding changes and variations according to the present document without departing from the spirit and substance of the present document, and all these corresponding changes and variations should belong to the protection scope of the appended claims of the present document.

INDUSTRIAL APPLICABILITY

In the embodiments of the present invention, the size information of the connected display device is identified, a suitable definition improving algorithm is dynamically selected to perform an image magnification process on the video information, and different definition algorithms are used for process of display devices of different sizes, which improves play experience of high definition videos, and solves the problem of fuzzy display due to performing an magnification process on the video images using a unified fixed algorithm. At the same time, different definition improving algorithms are used for display devices of different sizes, which effectively reduces the power consumption of the mobile terminal.

What is claimed is:

1. A method for improving video output definition, comprising:
   determining a correspondence between information of display devices and definition improving algorithms;
   connecting to a display device;
   acquiring information of the display device;
   determining a selected definition improving algorithm according to the correspondence between the information of display devices and the definition improving algorithms comprising a nearest neighbor magnification algorithm, a bilinear magnification algorithm, a bicubic magnification algorithm, a linear magnification algorithm and a differential magnification algorithm;
   processing original video signals according to the selected definition improving algorithm; and
   transmitting the processed video signals to the display device for display.

2. The method according to claim 1, wherein, the step of acquiring information of the display device comprises: a display device control module acquiring the information of the display device beforehand and storing the information in an accessible storage space; and after connecting to the display device, transmitting the information of the display device to a device identification module through a connection line or a display device identification module acquiring the information of the display device through accessing the storage space.

3. The method according to claim 1, wherein, after acquiring the information of the display device, the method further comprises: if it is judged that there is no definition improving algorithm suitable for the connected display device according to the correspondence between information of display devices and definition improving algorithms, directly transmitting the original video signals to the display device for display.

4. A terminal device for improving video output definition, configured to be connected to a display device through an interface, output video signals stored by the terminal device to the display device for video play, wherein the terminal device comprises a display device identification module, a definition improving algorithm set module, and a video controller module, wherein,
   the display device identification module is configured to be connected to the display device through an interface, identify information of the display device, and transmit the information of the display device to the definition improving algorithm set module;

the definition improving algorithm set module is configured to store definition improving algorithms, and after receiving the information of the display device, select a suitable definition improving algorithm according to the correspondence between the information of display devices and definition improving algorithms comprising a nearest neighbor magnification algorithm, a bilinear magnification algorithm, a bicubic magnification algorithm, a linear magnification algorithm and a differential magnification algorithm, and transmit the suitable definition improving algorithm to the video controller module; and the video controller module is configured to process the stored video signals according to the selected definition improving algorithm, and transmit the processed video signals to the display device through the interface for display.

5. The terminal device according to claim 4, wherein, the display device identification module is configured to acquire the information of the display device through accessing an accessible storage space of the display device.

6. The terminal device according to claim 4, wherein, the display device identification module is further configured to notify the video controller module to directly output the video signals to the display device for display when it is judged that there is no definition improving algorithm suitable for the connected display device according to the correspondence between the information of the display devices and definition improving algorithms comprising a nearest neighbor magnification algorithm, a bilinear magnification algorithm, a bicubic magnification algorithm, a linear magnification algorithm and a differential magnification algorithm.

7. The terminal device according to claim 4, wherein, the interface is a High Definition Multimedia Interface (HDMI), and the terminal device is configured to be connected to the display device through an HDMI connection line.

8. The terminal device according to claim 5, wherein, the interface is a High Definition Multimedia Interface (HDMI), and the terminal device is configured to be connected to the display device through an HDMI connection line.

9. The terminal device according to claim 6, wherein, the interface is a High Definition Multimedia Interface (HDMI), and the terminal device is configured to be connected to the display device through an HDMI connection line.

* * * * *